US006906432B2

(12) United States Patent
Belokon et al.

(10) Patent No.: US 6,906,432 B2
(45) Date of Patent: Jun. 14, 2005

(54) ELECTRICAL POWER GENERATION SYSTEM AND METHOD (75) Inventors: Alexander Belokon, Moscow (RU); Mikhail Senkevich, Moscow (RU); George L. Touchton, Newark, CA (US)

(73) Assignee: MES International, Inc., Asheville, NC (US)

( * ) Notice: Subject to any disclaimer, the term of this patent is extended or adjusted under 35 U.S.C. 154(b) by 154 days.

(21) Appl. No.: 10/612,685

(22) Filed: Jul. 2, 2003

(65) Prior Publication Data
US 2005/0001598 A1 Jan. 6, 2005

(51) Int. Cl.[7] .............................................. F02D 41/00
(52) U.S. Cl. ........................ 290/52; 123/350; 322/14
(58) Field of Search ........................ 290/1 A, 7, 40 C, 290/52; 322/14; 123/350, 352

(56) References Cited

U.S. PATENT DOCUMENTS

| 3,342,999 A | | 9/1967 | Townsend |
| 3,764,815 A | | 10/1973 | Habock et al. |
| 3,891,915 A | * | 6/1975 | Yannone et al. .............. 322/15 |
| 3,943,373 A | * | 3/1976 | Yannone et al. .......... 290/40 R |
| 4,031,407 A | * | 6/1977 | Reed ............................ 307/87 |
| 4,219,738 A | | 8/1980 | Griesinger |
| 4,309,871 A | | 1/1982 | Venema |
| 4,399,397 A | | 8/1983 | Kleinschmidt, Jr. |
| 4,421,989 A | | 12/1983 | Brännström |
| 4,434,613 A | | 3/1984 | Stahl |
| 4,492,874 A | | 1/1985 | Near |
| 4,529,887 A | | 7/1985 | Johnson |
| 4,553,516 A | | 11/1985 | Hasegawa |
| 4,754,607 A | | 7/1988 | Mackay |
| 4,959,896 A | | 10/1990 | Bolin et al. |
| 5,332,959 A | | 7/1994 | Malmquist et al. |
| 5,376,877 A | | 12/1994 | Kern et al. |
| 5,635,768 A | | 6/1997 | Birch et al. |
| 5,685,156 A | | 11/1997 | Willis et al. |
| 5,775,299 A | | 7/1998 | Ito et al. |
| 5,901,683 A | * | 5/1999 | Patel ............................ 123/352 |
| 5,903,116 A | | 5/1999 | Geis et al. |
| 6,020,713 A | | 2/2000 | Geis et al. |
| 6,023,135 A | | 2/2000 | Gilbreth et al. |
| 6,141,953 A | | 11/2000 | Mongia et al. |
| 6,163,078 A | | 12/2000 | Utamura |
| 6,169,332 B1 | | 1/2001 | Taylor et al. |
| 6,169,334 B1 | | 1/2001 | Edelman |
| 6,281,596 B1 | | 8/2001 | Gilbreth et al. |
| 6,281,601 B1 | | 8/2001 | Edelman et al. |
| 6,405,522 B1 | | 6/2002 | Pont et al. |
| 6,410,992 B1 | | 6/2002 | Wall et al. |
| 6,438,937 B1 | | 8/2002 | Pont et al. |
| 6,487,096 B1 | | 11/2002 | Gilbreth et al. |
| 6,522,030 B1 | | 2/2003 | Wall et al. |
| 6,564,172 B1 | * | 5/2003 | Till ............................ 702/182 |
| 6,784,565 B2 | * | 8/2004 | Wall et al. ..................... 290/52 |

FOREIGN PATENT DOCUMENTS

JP 60206967 10/1985
JP 01117958 5/1989

OTHER PUBLICATIONS

International Search Report for PCT/US2004/021338; Filed Jul. 1, 2004; Date of Completion Oct. 25, 2004; Date of Mailing Nov. 3, 2004.

* cited by examiner

Primary Examiner—Nicholas Ponomarenko
(74) Attorney, Agent, or Firm—Alston & Bird LLP (57) ABSTRACT An electrical power generating system and method wherein a generator is driven by an air-breathing engine. At any operating condition, for a given power output the engine efficiency is substantially optimized by controlling the rate of air flow through the engine in such a manner that the fuel/air ratio is controlled to maintain a high peak temperature imparted to the working fluid in the engine. The method and system of the invention eliminate the need for variable-geometry mechanisms in the engine, and also eliminate the need for variable-geometry combustors and pre-burners. The invention is applicable to various types of air-breathing engines that operate at low fuel/air ratios.

29 Claims, 3 Drawing Sheets

ELECTRICAL POWER GENERATION SYSTEM AND METHOD

FIELD OF THE INVENTION

This invention relates to the generation of electrical power using an air-breathing engine to drive a generator, which produces electrical current for supply to a load. The invention in particular embodiments relates to the generation of electrical power using a generator powered by a small turbine engine.

BACKGROUND OF THE INVENTION

Distributed power generation is a concept that has been the subject of much discussion over the years, but to date there has not been widespread deployment of distributed generation systems. Distributed generation refers to the use of small electrical power generation systems located at the sites where the power is needed, and thus is to be distinguished from the traditional utility grid system in which a large central power plant produces power that is then transmitted over substantial distances to a plurality of users through a system of power transmission lines commonly referred to as a grid. In contrast to conventional power plants operated by utilities, which often can produce several megawatts of power, distributed generation systems are generally sized below two megawatts, and more typically in the 60 to 600 kilowatt range.

The failure of distributed generation to achieve widespread deployment can be attributed primarily to cost. In most areas of the United States, and indeed in much of the world, it simply has been cheaper for most users to purchase power from the grid than to invest in and operate a distributed generation system. A major factor driving the relatively high cost of power from distributed generation systems has been the relatively low efficiency of the small engines used in such systems, particularly at part-load operation conditions.

Typically, the generator in a distributed generation system is driven by a small turbine engine, often referred to as a microturbine or miniturbine depending on size. A turbine engine generally comprises a combustor for burning a fuel and air mixture to produce hot gases by converting the chemical energy of the fuel into heat energy, a turbine that expands the hot gases to rotate a shaft on which the turbine is mounted, and a compressor mounted on or coupled with the shaft and operable to compress the air that is supplied to the combustor. Because of the relatively small amount of electrical power required from a distributed generation system, the turbine engine is correspondingly small. For reasons relating to the aerodynamics that take place within the engine, and other reasons, the efficiency of a turbine engine tends to decrease with decreasing engine size. Accordingly, microturbines and miniturbines automatically have an efficiency disadvantage relative to larger engines.

Furthermore, irrespective of size, the part-load efficiency of a turbine engine is notoriously poor, generally because of the particular manner in which the engine is operated at part-load conditions. More particularly, it is typically the case in turbine engines that the turbine inlet temperature, which essentially represents the peak temperature of the working fluid in the engine cycle, falls as the power output from the engine decreases below the "design" point. The design point is typically a 100 percent rated load condition, and the engine is usually designed so that its peak efficiency occurs substantially at the design point. It is well known that the primary variable influencing the efficiency of the thermodynamic cycle of an engine is the peak temperature of the working fluid. All other things being equal, the greater the peak temperature, the greater the efficiency; conversely, the lower the peak temperature, the lower the efficiency. Therefore, if the engine, when operating at a part-load condition, is controlled in such a manner that the peak effective temperature of the working fluid in the cycle (i.e., the turbine inlet temperature) is substantially lower than what it is at the design point, the efficiency of the engine tends to suffer to a substantial extent.

In some prior-art gas turbines, particularly aircraft gas turbine engines for propulsion and large gas turbines for constant-speed electrical generator systems, variable-geometry systems have been used at part-load conditions to reduce the air flow rate so that engine efficiency does not unduly suffer. For instance, variable inlet guide vanes (IGVs) have been used in axial-flow compressors; at part-load conditions, the IGVs are closed down to reduce the air flow rate for a given compressor speed. In the case of radial compressors, the stator vanes have sometimes been made variable for achieving a similar effect. In still other cases, variable first-stage turbine vanes or nozzles have been employed for controlling the speed of the turbine and, hence, the speed of the compressor, so as to control air flow rate. Such variable-geometry systems are expensive, and the bearings and other movable components are prone to wear, thus making these systems impractical for electrical generation systems that must be available for service for a high percentage of hours per year, must be able to operate essentially continuously if required, and must also be able to respond quickly to changes in the power required by the load being served. Furthermore, variable-geometry mechanisms are not practical to implement in microturbines and miniturbines because of the small size of the engine. Thus, a need exists for an alternative to variable-geometry methods for optimizing engine performance at part-load conditions.

Emissions (including but not limited to nitrogen oxides, unburned hydrocarbons, and carbon monoxide) represent another aspect of distributed generation that has proven challenging. In general, for a given power output, $NO_x$ emissions tend to be reduced or minimized by minimizing the temperature of combustion of the fuel (also known as the flame temperature), which in general is higher than the peak thermodynamic temperature (turbine inlet temperature), thus reducing the production of oxides of nitrogen without adversely affecting efficiency. The primary method of reducing the flame temperature is to premix the fuel and air prior to the combustion zone to produce a mixture with a high relative ratio of fuel to air, i.e., a lean mixture. The premixing also assures that the temperature throughout the flame zone is very nearly uniform without hot spots that can lead to the local production of NOx. However, as the mixture is made leaner, carbon monoxide (CO), unburned hydrocarbon (UHC), and pressure fluctuations increase. These trends continue and the flame zone becomes more unstable as the mixture is made still leaner, until the lean extinction limit is reached. For mixtures any leaner than this limit, no flame can be sustained. In practice, carbon monoxide and unburned hydrocarbon emissions and/or pressure pulsations become unacceptably high before the lean extinction limit is reached.

The lean extinction limit may be moved to leaner regimes by increasing the inlet temperature to the combustor and by using catalytic combustion. The use of catalytic combustion substantially increases the operating regime for lean premixed combustion, resulting in very low $NO_x$ emission, acceptable CO and UHC emissions, and essentially no pressure pulsations. Catalytic combustion does, however, introduce another constraint on operation called the lower catalytic activity limit. The inlet temperature to the catalytic combustor must be kept above this limit to sustain catalytic combustion.

In many conventional microturbines, the engine control is such that at part-load conditions the combustor inlet temperature tends to fall and the fuel/air mixture becomes leaner. In the case of conventional lean pre-mixed combustion, this tends to result in increased emissions; in the case of catalytic combustion, the falling combustor inlet temperature can lead to failure to sustain catalytic combustion. In practice, lean-premixed and catalytic combustors are able to operate over only a portion of the load range of the gas turbine because of falling combustor inlet temperatures and the progressively leaner conditions that prevail as load is decreased.

In some cases, pre-burners have been used before combustors for boosting the combustor inlet temperature. Additionally, variable-geometry combustors have been used in which a portion of the air is diverted around the combustor to maintain the fuel/air ratio at a level allowing operational stability. The pre-burner solution poses a reliability penalty in that over-temperature or other malfunction of the pre-burner can damage the main burner, and also adds to the cost of the system. In addition, it imposes an operating cost penalty as a result of the pressure loss that occurs through the pre-burner; this pressure loss is experienced even when the pre-burner is not in use. Variable geometry can be applied to eliminate the pressure loss penalty in addition to its use in maintaining fuel/air ratio. However, variable geometry solutions are costly, complicated, and prone to excessive wear, decreasing reliability and increasing maintenance costs.

For many potential users, these factors have combined to make electrical power generation via distributed generation systems less attractive than purchasing power from the large utilities.

SUMMARY OF THE INVENTION

The present invention addresses the above needs and achieves other advantages, by providing an electrical power generating system and method wherein, at any operating condition, for a given power output the engine efficiency is substantially optimized by controlling the rate of air flow through the engine in such a manner that the fuel/air ratio is controlled to maintain a high peak temperature imparted to the working fluid in the engine. The method and system of the invention eliminate the need for variable-geometry mechanisms in the engine, eliminate the need for variable-geometry combustors, and also minimize the need for pre-burners. The invention is applicable to various types of air-breathing engines that operate at low fuel/air ratios, including but not limited to rotary engines such as turbine engines and reciprocating engines such as free piston engines.

In accordance with a method aspect of the invention, a method is provided for improving part-load efficiency of an air-breathing engine in an electrical generator system. The system has a movable shaft mechanically communicating with the engine and a fuel system coupled with the engine and operable to supply fuel to the engine at a controlled fuel flow rate; the engine is designed such that peak thermodynamic efficiency of the engine substantially coincides with a 100 percent load operating condition of the engine. The system includes an electrical generator coupled to the shaft such that movement of the shaft by the engine causes the generator to operate to create an alternating electrical current, and the engine, shaft, and generator are connected such that a change in speed of the generator causes a corresponding change in speed of the engine and hence a change in rate of air flow through the engine. The method comprises the steps of operating the engine at a part-load condition, and controlling the speed of the generator at the part-load condition so as to control air flow rate through the engine while simultaneously controlling fuel flow rate to the engine so as to control fuel/air ratio in such a manner that a peak cycle temperature of the engine is substantially the same as the peak cycle temperature corresponding to the 100 percent load operating condition. In other words, the peak cycle temperature is not allowed to drop by any substantial extent when reducing load below the 100 percent load condition (although at very low load conditions the peak cycle temperature may be allowed to drop, as further described below). This is accomplished by controlling the fuel/air ratio, primarily through control of the air flow rate through the engine. Since the air flow rate is a function of the speed of the engine, the air flow rate can be controlled by controlling the generator speed.

In one embodiment, the step of controlling the speed of the generator comprises controlling an electrical current level downstream of the generator. This can be accomplished by converting the alternating current from the generator into a direct current and then converting the direct current into an alternating current at a fixed frequency independent of the speed of the generator; the fixed-frequency alternating current would then be supplied to the load. Using active current control in the AC-to-DC conversion, the level of the direct current is controlled so as to control the generator speed. For example, at a substantially constant fuel flow rate, by decreasing the direct current, a reduction in load on the shaft occurs and hence the generator speeds up so that output voltage is increased to maintain an overall energy balance; conversely, increasing the direct current increases the load on the shaft such that the generator slows down.

When a wound generator having an excitation system is employed, the control of generator speed may be accomplished at least in part by controlling the excitation system. Alternatively, the speed of the wound generator may be controlled by controlling the AC/DC converter as previously noted, or a combination of controlling the excitation system and controlling the AC/DC converter may be used.

In another embodiment of the invention, a recuperator is used to pre-heat the air that is mixed with the fuel, or to pre-heat the air-fuel mixture; the recuperator causes heat exchange between the air or mixture and the exhaust gases discharged from the engine. At very low part-load conditions, if the peak cycle temperature were maintained at the same level as the 100 percent load point, the temperature of the exhaust gases entering the recuperator could exceed a maximum allowable value (dictated by material limits, for example). Accordingly, in accordance with the invention, at such conditions, the generator speed is controlled so as to control air flow rate through the engine and thereby control fuel/air ratio in such a manner that the peak cycle temperature is allowed to fall below the peak cycle temperature corresponding to the 100 percent load operating condition; accordingly, the temperature of the exhaust gases entering the recuperator does not exceed the predetermined maximum allowable value.

In another aspect of the invention, the fuel is combusted in a catalytic combustor having a predetermined minimum inlet temperature required for maintenance of a catalytic reaction in the combustor. In many conventional engine control schemes, the combustor inlet temperature tends to fall as engine load is reduced below the 100 percent load condition; accordingly, it is possible for the temperature to fall below the minimum temperature required for the catalytic reaction. In accordance with the invention, the fuel/air ratio is controlled in such a manner at part-load conditions that an inlet temperature to the combustor is at least as great as the predetermined minimum inlet temperature. In one embodiment, the fuel/air ratio is controlled in such a manner that the inlet temperature to the combustor at a part-load condition is greater than the inlet temperature to the combustor at the 100 percent load condition.

A system for generating electrical power for supply to a load, in accordance with one embodiment of the invention, includes an air-breathing engine mechanically communicating with a movable shaft. An electrical generator is coupled to the shaft such that movement of the shaft by the engine causes the generator to operate to create an alternating electrical current. The engine, shaft, and generator are connected such that a change in speed of the generator causes a corresponding change in speed of the engine and hence a change in rate of air flow through the engine. The system further includes a fuel system coupled with the engine and operable to supply fuel to the engine, the fuel system being responsive to a fuel control signal to vary a rate of fuel flow to the engine; and at least one engine sensor operable to measure at least one thermodynamic variable associated with the engine that is indicative of a relative thermodynamic efficiency of the engine.

A power electronics unit is coupled to the generator for receiving the alternating electrical current therefrom and synthesizing an alternating output current at a predetermined frequency for supply to the load. The power electronics unit in one embodiment comprises an AC/DC module structured and arranged to operate upon the alternating electrical current from the generator so as to produce a non-alternating direct current at a non-alternating voltage, and a DC/AC module structured and arranged to operate upon the non-alternating direct current so as to synthesize an alternating output current and voltage at a predetermined frequency and relative phase for supply to the load. In one embodiment, the AC/DC module can be responsive to a current control signal to vary the level of the non-alternating direct current independently of the alternating electrical current from the generator.

The system also includes a generator power sensor operable to measure power output from the system, and a load power sensor operable to measure power demanded by the load. A controller is operably connected to the fuel system, to the at least one engine sensor, to the power electronics unit, to the generator power sensor, and to the load power sensor. The controller is operable to control the fuel system so as to cause the power output from the system to substantially match the power demanded by the load, and simultaneously to control the speed of the generator so as to control engine speed (and hence air flow rate), in such a manner that fuel/air ratio of the mixture burned in the engine is controlled to substantially maximize the relative thermodynamic efficiency of the engine.

Generator speed control can be accomplished by controlling the level of the non-alternating direct current from the AC/DC module of the power electronics unit, in the case of an actively controllable AC/DC module. In another embodiment wherein the generator is a wound generator having an excitation system, the control system can be operable to control the excitation system so as to control generator speed and hence air flow rate.

In a system as described above, another method in accordance with the invention comprises the steps of:

determining a power demanded by the load;

measuring at least one thermodynamic variable associated with the engine that is indicative of a relative thermodynamic efficiency of the engine;

controlling the fuel supply system to supply fuel to the engine at a controlled fuel flow rate such that the electrical power output from the system substantially matches the power demanded by the load; and controlling the air flow rate through the engine independently of the electrical power output from the system so as to control fuel/air ratio of the mixture burned in the engine in such a manner as to substantially optimize the thermodynamic efficiency of the engine while substantially matching the power demanded by the load, the air flow rate being controlled by electrically controlling the speed of the generator and hence the air flow rate through the engine.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
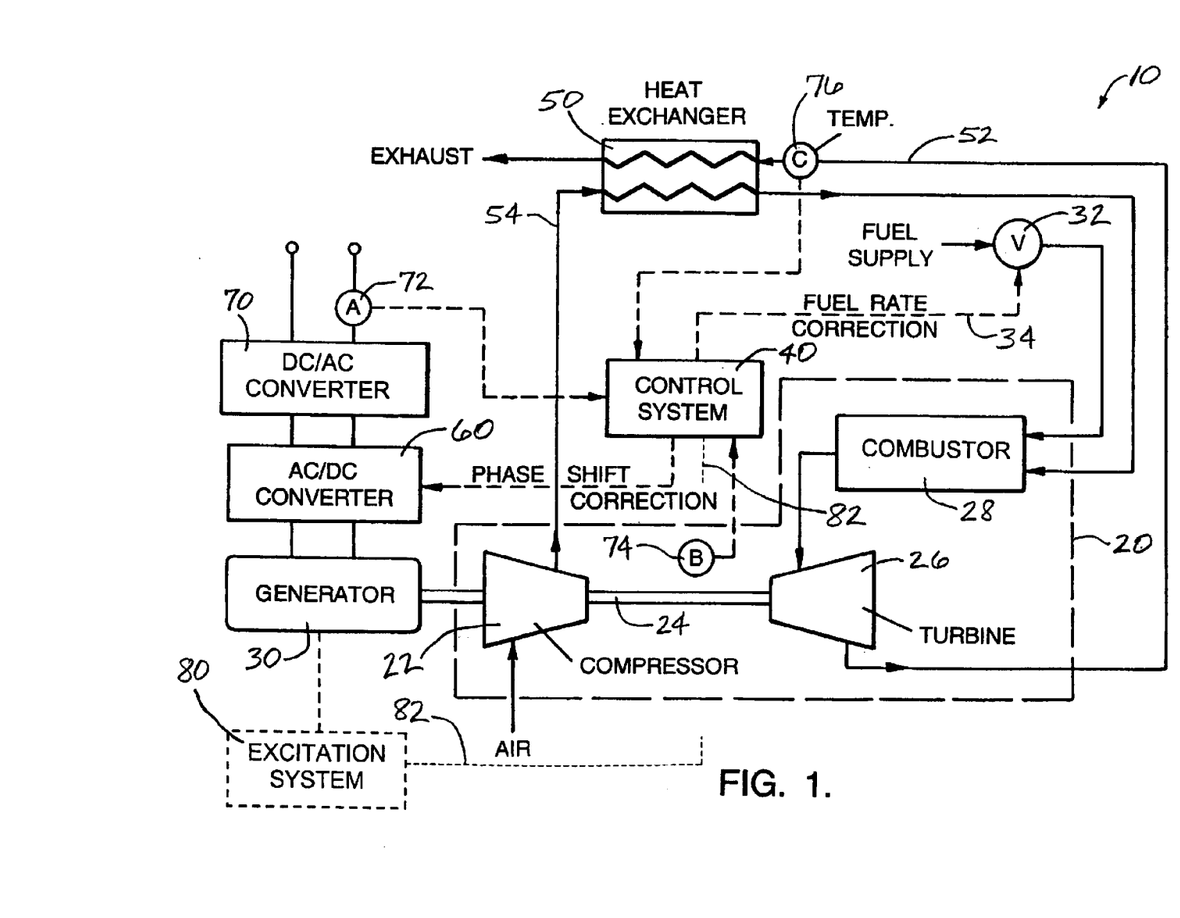
FIG. 1 is a diagrammatic view of an electrical generation system in accordance with one embodiment of the invention.

An electrical generator system 10 in accordance with one embodiment of the invention is schematically shown in FIG. 1. The system includes an air-breathing engine 20 that burns a mixture of fuel and air to produce hot combustion gases that are then expanded to create mechanical power. In the illustrated embodiment, the engine comprises a turbine engine having a compressor 22 mounted on one end of a rotatable shaft 24, a turbine 26 mounted on the other end of the shaft, and a combustor 28 for burning the fuel/air mixture. The combustor can be of various types, including but not limited to diffusion flame, catalytic, lean pre-mixed, or others. A mixture of fuel and air is supplied to the combustor. The air is first pressurized by the compressor. The fuel/air mixture is burned in the combustor and the hot combustion gases are supplied to the turbine, which expands the gases, causing the turbine to be rotatably driven. The turbine in turn rotates the shaft, which drives the compressor.

The system includes an electrical generator 30 in communication with the shaft 24 in such a manner that movement of the shaft causes the generator to be driven. In the illustrated embodiment in which the shaft is rotatable, the generator is likewise rotatable, and rotary motion of the shaft is imparted to the generator. The generator can be directly mounted on or connected to the shaft such that a one-to-one speed relationship exists between the shaft and the generator, or alternatively the generator and shaft can be connected through a gear train or the like so that a different speed relationship exists. It is also possible for the shaft to be reciprocating rather than rotary, and for the generator to be either reciprocating or rotary. In any event, the speed at which the generator operates dictates the speed of the shaft, and hence the speed at which the engine operates.

The generator 30 can be of various types, including permanent magnet generators or wound generators, or combinations thereof. The generator produces an alternating electrical current and voltage. As further described below, in the illustrated embodiment the alternating electrical current from the generator is operated on by power electronics to produce an alternating output current and voltage at a predetermined fixed frequency and phase relationship for supply to a load.

The system 10 also includes a fuel system for supplying fuel to the combustor 28. The fuel system generally includes a fuel pump (not shown) and a fuel metering valve 32 that is controllable by a suitable control signal 34 so as to control the fuel flow rate. A control system 40 is connected to the fuel metering valve 32 for controlling its operation. The control system also performs other functions as further described below.

The system 10 can also include an optional recuperator 50 comprising a heat exchanger for transferring heat from engine exhaust gases 52 to the compressed air 54 discharged from the compressor 22 before the air is supplied to the combustor. The recuperator captures some of the waste heat that would otherwise be lost and uses it to preheat the combustion air and thereby increase the overall efficiency of the engine, as known in the art.

As noted, the system 10 also includes power electronics. In the illustrated embodiment, the power electronics comprise an AC/DC converter 60 and a DC/AC module or inverter 70. The AC/DC converter 60 can comprise any suitable converter operable to convert the alternating electrical current produced by the generator, which can vary in frequency as the speed of the generator varies, into a non-alternating direct current, and further operable in a current-control mode to control the level of the direct current independently of the characteristics of the alternating input current (within certain limits). Such active current control is generally based on pulse-width modulation (PWM) schemes utilizing semiconductor switching devices that perform switching operations at a high frequency and effectively allow current to pass only during a portion of each period of the input current waveform. This "time window" during which current is allowed to pass can be varied in duration so as to vary the "average" current output from the converter.

The DC/AC module or inverter 70 then processes the output from the AC/DC converter 60 so as to synthesize an alternating output current at a fixed frequency. In many countries, the standard mains frequency is 60 cycles per second, while in other countries it is 50 cycles per second. The output frequency from the inverter is selected to match the standard mains frequency used in the particular location at which the system 10 is to be operated.

The system 10 also includes a number of sensors connected to the control system 40 for measuring various parameters. For instance, an output power meter 72 is arranged for measuring how much electrical power is being generated by the system. One or more engine sensors 74 monitor one or more thermodynamic variables associated with the engine cycle. The thermodynamic variables are used for determining where the engine is operating on its "map", i.e., whether the engine is running at or near its design point or is running off-design. For example, a turbine inlet temperature sensor can be used for measuring turbine inlet temperature. As previously noted, the turbine inlet temperature represents the peak temperature of the working fluid in the engine and generally correlates with overall efficiency of the engine. Hence, by measuring turbine inlet temperature along with other parameters, it is possible to deduce a relative thermodynamic efficiency of the engine.

A sensor 76 measures an inlet temperature to the recuperator 50 in the exhaust-gas stream. At part-load conditions, if the engine is not properly controlled, the inlet temperature to the recuperator could exceed the maximum allowable level dictated by material limits. Accordingly, the control system advantageously is connected to the sensor 76 for monitoring the recuperator inlet temperature, and the control system adjusts the air flow rate through the engine to prevent the temperature from exceeding the material limit, while maintaining the turbine inlet temperature as high as possible within this additional constraint.

It may not be necessary to actually deduce a relative thermodynamic efficiency, but merely to measure one or more parameters that are indicative of the relative efficiency or the operating condition of the engine. For example, as noted, it is known that for a given power output from the engine (and hence a given power output from the generator as measured by the power meter 72), engine efficiency generally will be optimized by maximizing the turbine inlet temperature. Accordingly, control of the fuel/air ratio, through control of the air flow rate, can be effected so as to maximize the turbine inlet temperature, within allowable limits. More particularly, the materials of the turbine inlet nozzles have a maximum allowable temperature that should not be exceeded, in order to preserve sufficient material strength and integrity to avoid failure of the parts. At the 100 percent load design point, generally the engine would be designed so that turbine inlet temperature is at or near this maximum allowable temperature. For lower load conditions, air flow can be controlled in such a manner that the turbine inlet temperature does not fall substantially below what it is at the design point.

Where the system includes a recuperator 50, considerations of material limits in the recuperator may necessitate a departure from this constant turbine inlet temperature mode of operation. More particularly, at very low part-load conditions, if the turbine inlet temperature were maintained at the same level as the 100 percent load point, the temperature of the exhaust gases entering the recuperator could exceed a maximum allowable value dictated by material limits of the recuperator. Accordingly, in accordance with the invention, at such conditions, the generator speed can be controlled so as to control air flow rate through the engine (while simultaneously controlling fuel flow rate to the engine) so as to control fuel/air ratio in such a manner that the turbine inlet temperature is allowed to fall below the temperature corresponding to the 100 percent load operating condition. In this manner, the temperature of the exhaust gases entering the recuperator can be prevented from exceeding the predetermined maximum allowable value.

Thus, for example, the control system 40 may have stored in memory a predetermined schedule of turbine inlet temperature versus relative generator load. The relative generator load, which is reflected by the power output measured by the power meter 72, generally indicates the relative engine load and hence gives an indication of where the engine is operating on its map. A suitable control algorithm can be used by the control system 40 to control air flow (via control of generator speed in some suitable manner, such as by controlling the DC current from the AC/DC converter 60) in such a manner that the turbine inlet temperature is caused to substantially match the value dictated by the predetermined schedule. This is merely a simplified example of one possible control scheme, and other schemes may be used in accordance with the invention.

Figure 2:
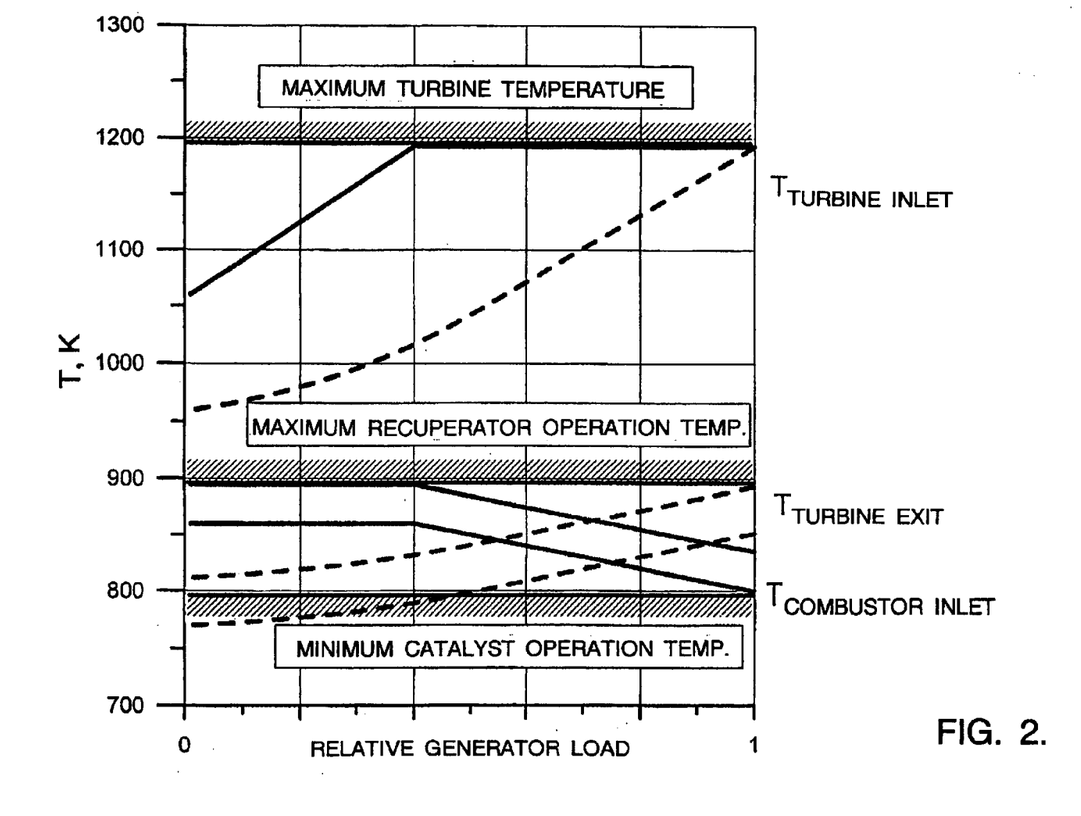
FIG. 2 is a plot of temperatures at various points in the engine as functions of the relative generator load, comparing a prior-art control method (dashed lines) with a control method in accordance with one embodiment of the invention (solid lines)

FIG. 2 shows what such a turbine inlet temperature versus relative generator load schedule might look like, and compares various temperatures at different points in the system 10 (solid lines) with corresponding temperatures that would exist if a prior-art type of control approach were taken (dashed lines). In accordance with the invention, at a relative generator load value of 100 percent (i.e., the design point for the engine), turbine inlet temperature is substantially equal to a maximum allowable turbine inlet temperature of about 1200 K. The turbine inlet temperature is maintained at this value down to a relative generator load of about 40 percent. In contrast, in the prior-art control approach, the turbine inlet temperature steadily drops as the load drops below 100 percent. Consequently, at the same relative load, the overall engine efficiency is higher for the control scheme in accordance with the invention than for the prior-art control scheme.

At a relative load of 40 percent, it can be seen that the turbine exit temperature (which is essentially equal to the recuperator inlet temperature) has increased up to the maximum allowable recuperator temperature of about 900 K. At still lower loads, if the turbine inlet temperature were maintained at about 1200 K, the turbine exit temperature would exceed the maximum allowable recuperator temperature. Accordingly, in accordance with the invention, the turbine inlet temperature is allowed to drop below 1200 K.

Another factor that can influence the control schedule arises when the combustor 28 is a catalytic combustor. As noted, catalytic combustors have a minimum inlet temperature that must be maintained in order to sustain the catalytic reaction. In the prior-art control approach, it can be seen in FIG. 2 that below a relative load of about 50 percent the combustor inlet temperature falls below this minimum temperature of about 800 K. In accordance with the invention, however, the combustor inlet temperature rises from about 800 K at the 100 percent load point to about 860 K at the 40 percent load point. Below 40 percent load, the combustor inlet temperature remains about constant at approximately 860 K. The invention thus enables efficiency improvements to be realized at part-load conditions while also allowing proper operation of the catalytic combustor at all operating points.

Figure 3:
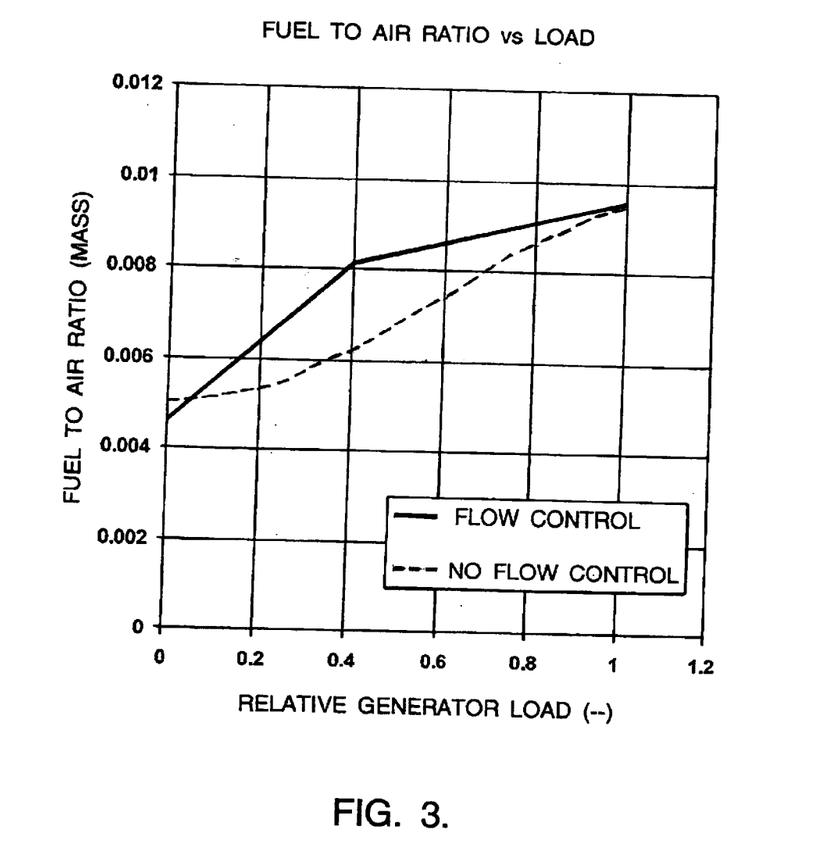
FIG. 3 is a plot of fuel/air ratio versus relative generator load, comparing a prior-art control method (dashed line) with a control method in accordance with one embodiment of the invention (solid line).

FIG. 3 illustrates how the fuel/air ratio behaves in both the inventive control approach using air flow control and the prior-art control approach not using air flow control. In the case of flow control, the fuel/air ratio is generally substantially higher at part-load conditions than in the prior-art method. The higher fuel/air ratio with flow control reflects the fact that the air flow rate is lower than in the prior-art control approach. From 100 percent down to 40 percent load, the fuel/air ratio using flow control decreases at a relatively low rate; the result is that turbine inlet temperature is maintained substantially constant as already noted in FIG. 2. Below 40 percent load, the fuel/air ratio with flow control is allowed to decrease at a substantially higher rate.

It will also be noted from FIG. 2 that the combustor inlet temperature is generally higher in the inventive control approach than in the prior-art approach. Advantageously, a higher fuel/air ratio and higher combustor inlet temperature generally favor lower emissions for pre-mixed low-emissions combustors.

The control scheme described thus far has assumed that turbine inlet temperature is measured directly and used as a control parameter. In some cases, however, it may not be practical to measure turbine inlet temperature because of the extreme usage environment in which a turbine inlet temperature sensor would have to operate. Alternatively, therefore, it is possible to measure other thermodynamic variables in the engine cycle and deduce the turbine inlet temperature based on cycle calculations. As still another alternative, the control system could store a schedule of a suitable control parameter (e.g., engine air flow rate) versus relative generator load, and thermodynamic variables could be measured enabling the control parameter to be deduced; the control system would then drive the actual (i.e., deduced) control parameter to substantially equal the scheduled value.

The particular control method that is used, and the parameters measured for effecting the method, are not critical. The basic concept of the invention entails controlling air flow rate through the engine as a means of enhancing or optimizing the overall engine efficiency for any given power output from the generator system 10.

At the same time, in a load-following operational mode, the power output from the generator system 10 must be controlled to match the power demanded by the load. The power output is primarily a function of the fuel flow rate. Accordingly, in a load-following mode, the control system 40 simultaneously controls air flow as described above while also controlling the power output (as measured by power meter 72) to match the demand. Load-following control schemes are well known and hence are not further described herein.

Depending on the particular application, the system 10 may also be operated in modes other than load-following. In such cases, the same type of air flow control already described would still be employed.

The system 10 described above has a single-spool turbine engine 20. However, the invention is not limited to any particular type of air-breathing engine. Multiple-spool turbine engines, turbine engines having a free power turbine, rotary combustion (e.g., Wankel) engines, reciprocating piston engines, and others can be used. In each case, the air flow rate through the engine is controlled by controlling generator speed.

The generator 30 can be of various types, including permanent magnet generators and wound generators. The previously described embodiment of the system 10 assumed that the generator 30 is a permanent magnet generator in which there is no excitation system. In the case of a wound generator, on the other hand, the generator requires an excitation system 80 (FIG. 1) for supplying an excitation current to the rotor windings, as known in the art. The excitation system can comprise, for example, a small generator mounted on the same shaft as the rotor or mechanically coupled (e.g., by a drive belt) to the rotor shaft.

Regardless of the generator type, the invention entails electrically controlling the generator speed so as to control the air flow rate through the engine and thereby optimize engine efficiency and possibly achieve other effects as previously noted. In the case of a permanent magnet generator, the control of the generator is accomplished by controlling the AC/DC converter or rectifier 60 as already described. In the case of a wound generator, a number of control schemes are possible. In one scheme, the control system 40 controls the excitation system 80 (via control line 82) to regulate the generator speed. The AC/DC and DC/AC conversion may not be necessary, and instead an AC/AC converter may be used to synthesize the AC output current at the desired frequency for supply to the load. Alternatively, the AC/DC and DC/AC converters may be used as previously described, in which case the AC/DC converter does not have to be current-controlled since the regulation of generator speed is performed by controlling the excitation system.

In another scheme, generator speed control may be accomplished through a combination of controlling the excitation system and controlling the AC/DC converter. Yet another scheme is to control the generator speed solely through control of the AC/DC converter as already described.

The particulars of how the generator speed is controlled are not critical to the invention, and various schemes for accomplishing this can be used in accordance with the invention.

Advantageously, the invention allows control over the thermodynamic cycle of an engine having fixed-geometry compressor, turbine, and combustor components.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for generating electrical power for supply to a load, comprising:
   an air-breathing engine mechanically communicating with a movable shaft, the engine being structured and arranged to receive a mixture of air and fuel and burn the mixture such that the mixture expands and creates mechanical power that is used to drive the shaft;
   a fuel system coupled with the engine and operable to supply fuel to the engine, the fuel system being responsive to a fuel control signal to vary a rate of fuel flow to the engine;
   at least one engine sensor operable to measure at least one thermodynamic variable associated with the engine that is indicative of a relative thermodynamic efficiency of the engine;
   an electrical generator coupled to the shaft such that movement of the shaft by the engine causes the generator to operate to create an alternating electrical current, the engine, shaft, and generator being connected such that a change in speed of the generator causes a corresponding change in speed of the engine and hence a change in rate of air flow through the engine;
   a power electronics unit coupled to the generator for receiving the alternating electrical current therefrom and operable to synthesize an alternating output current and voltage at a predetermined frequency and relative phase for supply to the load;
   a generator power sensor operable to measure power output from generator;
   a load power sensor operable to measure power demanded by the load; and
   a controller operably connected to the fuel system, to the at least one engine sensor, to the power electronics unit, to the generator power sensor, and to the load power sensor, the controller being operable to control the fuel system so as to cause the power output from the system to substantially match the power demanded by the load, and simultaneously to electrically control the generator to regulate speed thereof so as to control air flow rate through the engine in such a manner that fuel/air ratio of the mixture burned in the engine is controlled to substantially maximize the relative thermodynamic efficiency of the engine.

2. The system of claim 1, wherein the power electronics unit comprises an AC/DC module structured and arranged to operate upon the alternating electrical current from the generator so as to produce a non-alternating direct current at a non-alternating voltage, and a DC/AC module structured and arranged to operate upon the non-alternating direct current so as to synthesize the alternating output current that is supplied to the load, the AC/DC module being responsive to a current control signal to vary the level of the non-alternating direct current independently of the alternating electrical current from the generator, the control system being operable to supply the current control signal to the AC/DC module to control the level of the direct current output by the AC/DC module and thereby control generator speed.

3. The system of claim 1, wherein the generator and shaft are rotationally movable.

4. The system of claim 3, wherein the engine comprises a compression device operable to compress air and a power device that receives the compressed air from the compression device and the fuel from the fuel system and burns the air and fuel mixture to produce mechanical power.

5. The system of claim 4, further comprising a heat exchanger arranged to receive the compressed air from the compression device and exhaust gases from the power device, the heat exchanger causing heat transfer from the exhaust gases to the compressed air so as to pre-heat the compressed air prior to combustion in the power device.

6. The system of claim 5, wherein the power device includes a combustor in which the air and fuel mixture is burned to produce hot gases, and an expansion device for expanding the hot gases so as to produce the mechanical power.

7. The system of claim 6, wherein the expansion device comprises a turbine.

8. The system of claim 7, wherein the turbine is a fixed-geometry turbine.

9. The system of claim 6, wherein the compression device is a fixed-geometry compressor.

10. The system of claim 6, wherein the combustor is a fixed-geometry combustor.

11. The system of claim 6, wherein the combustor comprises a catalytic combustor.

12. The system of claim 11, further comprising a sensor operable to measure a variable indicative of combustor inlet temperature, and wherein the controller is connected to said sensor and is operable to control air flow through the engine in such a manner as to maintain the combustor inlet temperature above a predetermined minimum temperature required for catalytic operation.

13. The system of claim 12, further comprising a sensor associated with the heat exchanger operable to measure a variable indicative of a temperature of the exhaust gases entering the heat exchanger, and wherein the controller is connected to said sensor associated with the heat exchanger and is operable to control air flow through the engine to maintain the temperature of the exhaust gases entering the heat exchanger below a predetermined maximum temperature.

14. The system of claim 1, wherein the generator is a wound generator.

15. The system of claim 14, further comprising an excitation system operable to excite the generator.

16. The system of claim 15, wherein the control system is operable to control the excitation system so as to electrically control the generator speed and thereby control air flow rate.

17. A method for controlling an electrical generator system having an air-breathing engine mechanically communicating with a movable shaft, the engine being structured and arranged to receive a mixture of air and fuel and burn the mixture such that the mixture expands and creates mechanical power that is used to drive the shaft, the system having a fuel system coupled with the engine and operable to supply fuel to the engine, the fuel system being responsive to a fuel control signal to vary a rate of fuel flow to the engine, the system having an electrical generator coupled to the shaft such that movement of the shaft by the engine causes the generator to operate to create an alternating electrical current, wherein the engine, shaft, and generator are connected such that a change in speed of the generator causes a corresponding change in speed of the engine and hence a change in rate of air flow through the engine, and the system having a power electronics unit coupled to the generator for receiving the alternating electrical current therefrom and operable to synthesize an alternating output current and voltage at a predetermined frequency and relative phase for supply to the load, wherein electrical power output from the system is substantially determined by fuel flow rate to the engine, the method comprising the steps of:
  determining a power demanded by the load;
  measuring at least one thermodynamic variable associated with the engine that is indicative of a relative thermodynamic efficiency of the engine;
  controlling the fuel supply system to supply fuel to the engine at a controlled fuel flow rate such that the electrical power output from the system substantially matches the power demanded by the load; and
  controlling the air flow rate through the engine independently of the electrical power output from the system so as to control fuel/air ratio of the mixture burned in the engine in such a manner as to substantially optimize the thermodynamic efficiency of the engine while substantially matching the power demanded by the load, the air flow rate being controlled by electrically controlling the speed of the generator and hence the air flow rate through the engine.

18. The method of claim 17, wherein the alternating electrical current from the generator is converted in an AC/DC module into a non-alternating direct current at a non-alternating voltage, and the non-alternating direct current from the AC/DC module is converted in a DC/AC module to synthesize the alternating output current that is supplied to the load, the AC/DC module being responsive to a current control signal to vary the level of the non-alternating direct current independently of the alternating electrical current from the generator, and wherein the step of controlling the air flow rate comprises actively controlling the non-alternating direct current from the AC/DC module of the power electronics unit so as to alter the speed of the generator and hence the air flow rate.

19. A method for controlling an electrical generator system having an air-breathing engine mechanically communicating with a movable shaft, the engine being structured and arranged to receive a mixture of air and fuel and burn the mixture such that the mixture expands and creates mechanical power that is used to drive the shaft, the system having a fuel system coupled with the engine and operable to supply fuel to the engine, the fuel system being responsive to a fuel control signal to vary a rate of fuel flow to the engine, the system having an electrical generator coupled to the shaft such that movement of the shaft by the engine causes the generator to operate to create an alternating electrical current, wherein the engine, shaft, and generator are connected such that a change in speed of the generator causes a corresponding change in speed of the engine and hence a change in rate of air flow through the engine, and wherein electrical power output from the system is substantially determined by fuel flow rate to the engine, the method comprising the steps of:
  determining a power demanded by the load;
  measuring at least one thermodynamic variable associated with the engine that is indicative of a relative thermodynamic efficiency of the engine;
  controlling the fuel supply system to supply fuel to the engine at a controlled fuel flow rate such that the electrical power output from the system substantially matches the power demanded by the load;
  operating upon the alternating electrical current from the generator so as to produce a non-alternating direct current at a non-alternating voltage;
  operating upon the non-alternating direct current so as to synthesize an alternating output current and voltage at a predetermined frequency and relative phase for supply to the load;
  controlling the air flow rate through the engine independently of the electrical power output from the system so as to control fuel/air ratio of the mixture burned in the engine in such a manner as to substantially optimize the thermodynamic efficiency of the engine while substantially matching the power demanded by the load, the air flow rate being controlled by actively controlling the non-alternating direct current so as to alter the speed of the generator and hence the air flow rate through the engine.

20. The method of claim 19, wherein optimizing the thermodynamic efficiency of the engine comprises causing a peak temperature of a thermodynamic cycle of the engine to substantially match a predetermined value.

21. The method of claim 19, wherein the engine comprises a turbine engine having a compressor for compressing the air, a combustor for burning the mixture of air and fuel to produce hot gases, and a turbine for expanding the hot gases, and wherein optimizing the thermodynamic efficiency of the engine comprises causing a turbine inlet temperature to substantially match a predetermined value.

22. The method of claim 21, wherein the combustor comprises a catalytic combustor, and further comprising the steps of:
  measuring a variable indicative of an inlet temperature to the combustor; and controlling air flow through the engine in such a manner as to maintain the combustor inlet temperature above a predetermined minimum temperature required for catalytic operation.

23. A method for improving part-load efficiency of an air-breathing engine in an electrical generator system, the system having a movable shaft mechanically communicating with the engine and a fuel system coupled with the engine and operable to supply fuel to the engine at a controlled fuel flow rate, the engine being designed such that peak thermodynamic efficiency of the engine substantially coincides with a design point operating condition of the engine, the system having an electrical generator coupled to the shaft such that movement of the shaft by the engine causes the generator to operate to create an alternating electrical current, wherein the engine, shaft, and generator are connected such that a change in speed of the generator causes a corresponding change in speed of the engine and hence a change in rate of air flow through the engine, and wherein electrical power output from the system is substantially determined by fuel flow rate to the engine, the method comprising the steps of:

operating the engine at a first part-load condition; and at said first part-load condition, controlling the speed of the generator so as to control air flow rate through the engine while simultaneously controlling fuel flow rate to the engine so as to control fuel/air ratio in such a manner that a peak cycle temperature of the engine is substantially the same as the peak cycle temperature corresponding to the design point operating condition.

24. The method of claim 23, further comprising the step of controlling the fuel flow rate so that electrical power output from the system substantially matches a power demand of the load at said part-load condition.

25. The method of claim 23, wherein the step of controlling the speed of the generator comprises controlling an electrical current level downstream of the generator.

26. The method of claim 25, wherein the alternating current from the generator is converted into a direct current and then the direct current is converted into an alternating current at a fixed frequency independent of the speed of the generator for supply to a load, and wherein the step of controlling the electrical current level comprises controlling the level of the direct current.

27. The method of claim 23, further comprising the steps of:

using a recuperator to pre-heat air being supplied to the engine for mixing with the fuel, the recuperator causing heat exchange between the air and exhaust gases discharged from the engine;

operating the engine at a second part-load condition that is lower in load than said first part-load condition; and at said second part-load condition, controlling the speed of the generator so as to control air flow rate through the engine while simultaneously controlling fuel flow rate to the engine so as to control fuel/air ratio in such a manner that the peak cycle temperature is allowed to fall below the peak cycle temperature corresponding to the design point operating condition so that the temperature of the exhaust gases entering the recuperator does not exceed a predetermined maximum allowable value.

28. The method of claim 23, wherein the fuel is combusted in a catalytic combustor having a predetermined minimum inlet temperature required for maintenance of a catalytic reaction in the combustor, and wherein the fuel/air ratio is controlled in such a manner at said first part-load condition that an inlet temperature to the combustor is at least as great as said predetermined minimum inlet temperature.

29. The method of claim 28, wherein the fuel/air ratio is controlled in such a manner that the inlet temperature to the combustor at said first part-load condition is greater than the inlet temperature to the combustor at said design point operating condition.

* * * * *